United States Patent
Danilov et al.

(10) Patent No.: US 10,996,884 B2
(45) Date of Patent: *May 4, 2021

(54) SYSTEM AND METHOD FOR REFERENCE TRACKING GARBAGE COLLECTOR

(71) Applicant: EMC IP HOLDING COMPANY LLC, Hopkinton, MA (US)

(72) Inventors: Mikhail Danilov, Saint Petersburg (RU); Nikita Gutsalov, Saint Petersburg (RU); Alexander Fedorov, Saint Petersburg (RU); Konstantin Buinov, Leningradskaya area (RU); Gregory Skripko, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/709,479

(22) Filed: Dec. 10, 2019

(65) Prior Publication Data
US 2020/0117385 A1    Apr. 16, 2020

Related U.S. Application Data

(63) Continuation of application No. 15/348,555, filed on Nov. 10, 2016, now Pat. No. 10,503,429.

(51) Int. Cl.
*G06F 3/06*     (2006.01)

(52) U.S. Cl.
CPC ............ *G06F 3/0652* (2013.01); *G06F 3/064* (2013.01); *G06F 3/067* (2013.01); *G06F 3/0608* (2013.01)

(58) Field of Classification Search
CPC ...... G06F 3/0652; G06F 3/0608; G06F 3/064; G06F 3/067
See application file for complete search history.

(56) References Cited

U.S. PATENT DOCUMENTS

| | | | |
|---|---|---|---|
| 5,790,848 | A | 8/1998 | Wlaschin |
| 7,421,493 | B1 | 9/2008 | Adams |
| 8,423,517 | B2 | 4/2013 | Kesselman et al. |
| 10,503,429 | B2 | 12/2019 | Danilov et al. |
| 2003/0061565 | A1 | 3/2003 | Brendle |
| 2005/0125411 | A1 | 6/2005 | Kilian et al. |
| 2017/0286009 | A1 | 10/2017 | Danilov et al. |

OTHER PUBLICATIONS

Non-Final Office Action issued in related U.S. Appl. No. 15/348,555 dated Mar. 7, 2018.
Non-Final Office Action issued in related U.S. Appl. No. 15/348,555 dated Sep. 20, 2018.
Final Office Action issued in related U.S. Appl. No. 15/348,555 dated Mar. 8, 2019.
Notice of Allowance issued in related U.S. Appl. No. 15/348,555 dated Jul. 25, 2019.

*Primary Examiner* — Eric Cardwell
(74) *Attorney, Agent, or Firm* — Brian J. Colandreo, Esq.; Mark H. Whittenberger, Esq.; Holland & Knight LLP

(57) ABSTRACT

A method, computer program product, and computer system for determining, by a computing device, that an object of a plurality of objects is an orphan. It may be determined that the object is older than a threshold age. A capacity occupied by the object may be reclaimed based upon, at least in part, determining that the object is an orphan and determining that the object is older than the threshold age.

14 Claims, 9 Drawing Sheets

SYSTEM AND METHOD FOR REFERENCE TRACKING GARBAGE COLLECTOR

RELATED APPLICATION

This application is a continuation of U.S. patent application Ser. No. 15/348,555, filed Nov. 10, 2016 which claims the priority of Russia Patent Application No. 2016112181, filed on 31 Mar. 2016, the contents of which are herein incorporated by reference in their entireties.

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to determining, by a computing device, that an object of a plurality of objects is an orphan. In certain implementations, it may be determined that the object is older than a threshold age. In many implementations, capacity occupied by an object may be reclaimed based upon, at least in part, determining that the object is an orphan and determining that the object is older than the threshold age.

One or more of the following example features may be included. In certain implementations, an object may be a Binary Large Object (BLOB). In other implementations, a first journal may be maintained, wherein the first journal may include a content address that references the object when the object is created. In certain implementations, a set of one or more positive references to the object populated from a first journal may be maintained. In many implementations, a second journal may be maintained, wherein the second journal may include a content address of a file that references the object when the object is deleted. In further implementations, a set of one or more negative references to the object populated from the second journal may be maintained. In many implementations, determining that the object is an orphan may include determining that the set of one or more positive references to the object populated from the first journal compensates the set of one or more negative references to the object populated from the second journal.

In another example implementation, a computing system may include one or more processors and one or more memories configured to perform operations that may include but are not limited to determining, by a computing device, that an object of a plurality of objects is an orphan. In this implementation, it may be determined that the object is older than a threshold age. In this implementation, a capacity occupied by the object may be reclaimed based upon, at least in part, determining that the object is an orphan and determining that the object is older than the threshold age.

One or more of the following example features may be included. In certain implementations, an object may be a Binary Large Object (BLOB). In some implementations, a first journal may be maintained, wherein the first journal may include a content address that references the object when the object is created. In other implementations, a set of one or more positive references to the object populated from a first journal may be maintained. In certain implementations, a second journal may be maintained, wherein the second journal may include a content address of a file that references the object when the object is deleted. In many implementations, a set of one or more negative references to the object populated from the second journal may be maintained. In many implementations, determining that an object is an orphan may include determining that the set of one or more positive references to the object populated from the first journal compensates the set of one or more negative references to the object populated from the second journal.

In another example implementation, a computer program product may reside on a computer readable storage medium having a plurality of instructions stored thereon which, when executed across one or more processors, may cause at least a portion of the one or more processors to perform operations that may include but are not limited to determining, by a computing device, that an object of a plurality of objects is an orphan. In many implementations, it may be determined that an object is older than a threshold age. In some implementations, a capacity occupied by the object may be reclaimed based upon, at least in part, determining that the object is an orphan and determining that the object is older than the threshold age.

One or more of the following example features may be included. In certain implementations, an object may be a Binary Large Object (BLOB). In many implementations, a first journal may be maintained, wherein the first journal may include a content address that references the object when the object is created. In alternative implementations, a set of one or more positive references to the object populated from the first journal may be maintained. In further implementations, a second journal may be maintained, wherein the second journal may include a content address of a file that references the object when the object is deleted. In many implementations, a set of one or more negative references to the object populated from a second journal may be maintained. In certain implementations, determining that an object is an orphan may include determining that the set of one or more positive references to the object populated from a first journal compensates the set of one or more negative references to the object populated from the second journal.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
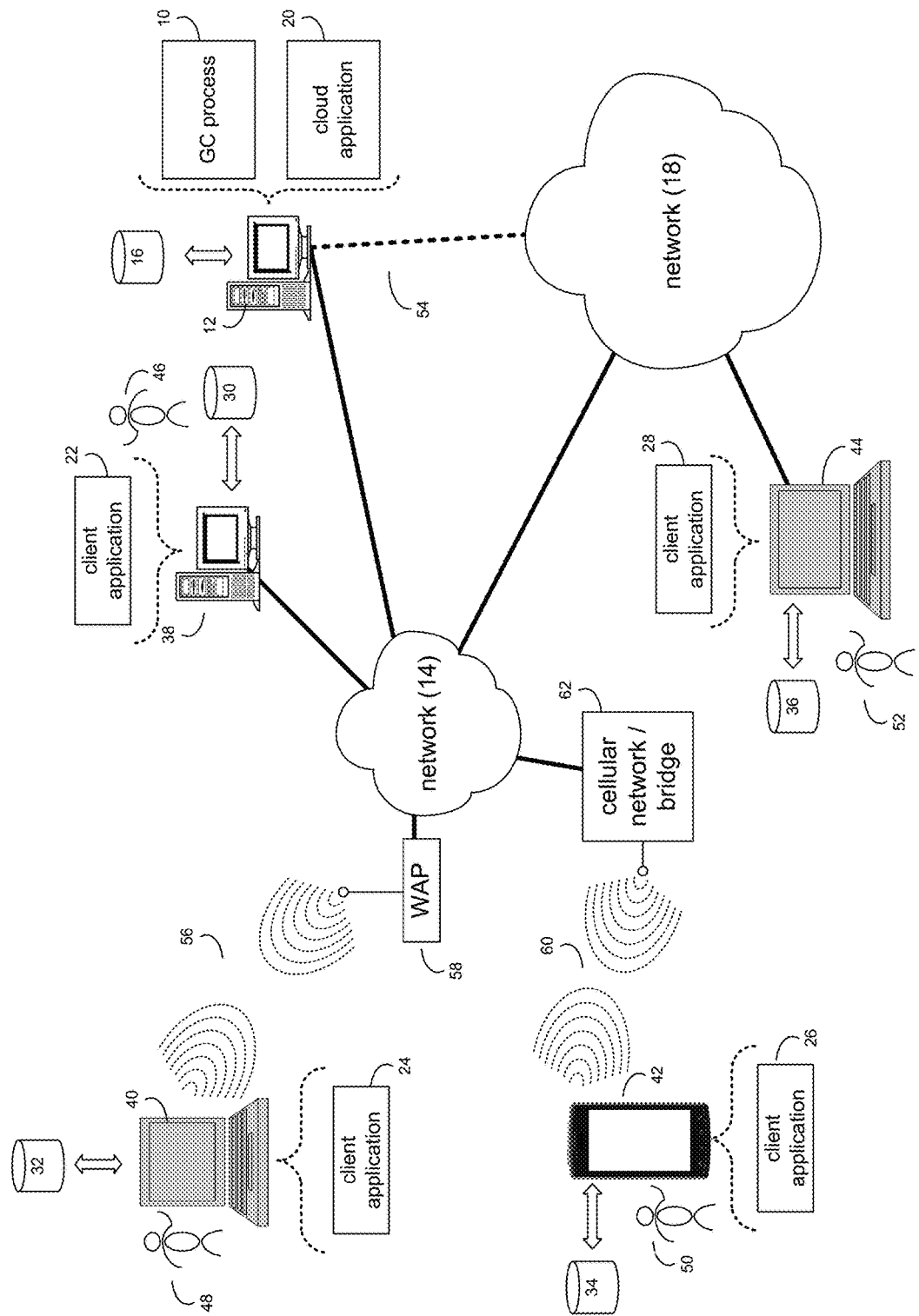
FIG. 1 is an example diagrammatic view of a GC process coupled to a distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. The computer readable program code may be transmitted using any appropriate medium, including but not limited to the internet, wireline, optical fiber cable, RF, etc. A computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGA), micro-controller units (MCUs), or programmable logic arrays (PLA) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. It will be understood that each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown GC process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, a garbage collection process, such as the garbage collection (GC) process 10 of FIG. 1, may determine, by a computing device, that an object of a plurality of objects is an orphan. In certain implementations, it may be determined that an object is older than a threshold age. In many implementations, a capacity occupied by an object may be reclaimed based upon, at least in part, determining that the object is an orphan and determining that the object is older than a threshold age.

In some implementations, the instruction sets and subroutines of GC process, such as GC process 10, which may be stored on a storage device, such as storage device 16 coupled to computer 12, may be executed by one or more processors and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In certain embodiments, a data store may also be a custom database, such as, for example, a flat file database or an XML database. In other embodiments another form(s) of a data storage structure and/or organization may also be used. In certain implementations, a GC process may be a component of the data store, a standalone application that interfaces with the above noted data store and/or an applet/application that is accessed via client applications, such as client applications 22, 24, 26, 28. In many implementations, a data store may be, in whole or in part, distributed in a cloud computing topology. In certain implementations, computer 12 and storage device 16 may refer to multiple devices, which may also be distributed throughout the network. An example cloud computing environment that may be used with the disclosure may include but is not limited to, e.g., Elastic Cloud Storage (ECS™) from EMC Corporation of Hopkinton, Mass. It will be appreciated that other cloud computing environments may be used without departing from the scope of the disclosure.

In some implementations, computer 12 may execute a cloud application (e.g., cloud application 20), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In certain embodiments, GC process 10 and/or cloud application 20 may be accessed via client applications 22, 24, 26, 28. GC process 10 may be a standalone application, or may be an applet/application/script/extension that may interact with and/or be executed within cloud application 20, a component of cloud application 20, and/or one or more of client applications 22, 24, 26, 28. In certain implementations, a Cloud application may be a standalone application, or may be an applet/application/script/extension that may interact with and/or be executed within a GC process, a component of GC process, and/or one or more of client applications, such as client applications 22, 24, 26, 28. In some implementations, one or more of client applications 22, 24, 26, 28 may be a standalone application, or may be an applet/application/script/extension that may interact with and/or be executed within and/or be a component of GC process 10 and/or cloud application 20. Examples of client applications 22, 24, 26, 28 may include, but are not limited to, e.g., a storage system application, a cloud computing application, a data synchronization application, a data migration application, garbage application, or other application that allows for the implementation and/or management of highly available data in a clustered environment (or the like), a standard and/or mobile web browser, an email application (e.g., an email client application), a textual and/or a graphical user interface, a customized web browser, a plugin, an Application Programming Interface (API), or a custom application. In certain implementations, the instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

In some implementations, storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of GC process 10 (and vice versa). Accordingly, in certain implementations GC process 10 may be a purely server-side application, a purely client-side application, or a hybrid server-side/client-side application that is cooperatively executed by one or more of client applications 22, 24, 26, 28 and/or GC process 10.

In some implementations, one or more of client applications 22, 24, 26, 28 may be configured to effectuate some or all of the functionality of cloud application 20 (and vice versa). Accordingly, in different implementations, cloud application 20 may be a purely server-side application, a purely client-side application, or a hybrid server-side/client-side application that is cooperatively executed by one or more of client applications 22, 24, 26, 28 and/or cloud application 20. In some implementations, as one or more of client applications 22, 24, 26, 28, GC process 10, and cloud application 20, taken singly or in any combination, may effectuate some or all of the same functionality, any description of effectuating such functionality via one or more of client applications 22, 24, 26, 28, GC process 10, cloud application 20, or combination thereof, and any described interaction(s) between one or more of client applications 22, 24, 26, 28, GC process 10, cloud application 20, or combination thereof to effectuate such functionality, should be taken as an example only and not to limit the scope of the disclosure.

In some implementations, users 46, 48, 50, 52 may access computer 12 and GC process 10 (e.g., using one or more of client electronic devices 38, 40, 42, 44) directly through network 14 or through secondary network 18. Further, computer 12 may be connected to network 14 through secondary network 18, as illustrated with phantom link line 54. In certain implementations, GC process 10 may include one or more user interfaces, such as browsers and textual or graphical user interfaces, through which users 46, 48, 50, 52 may access GC process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
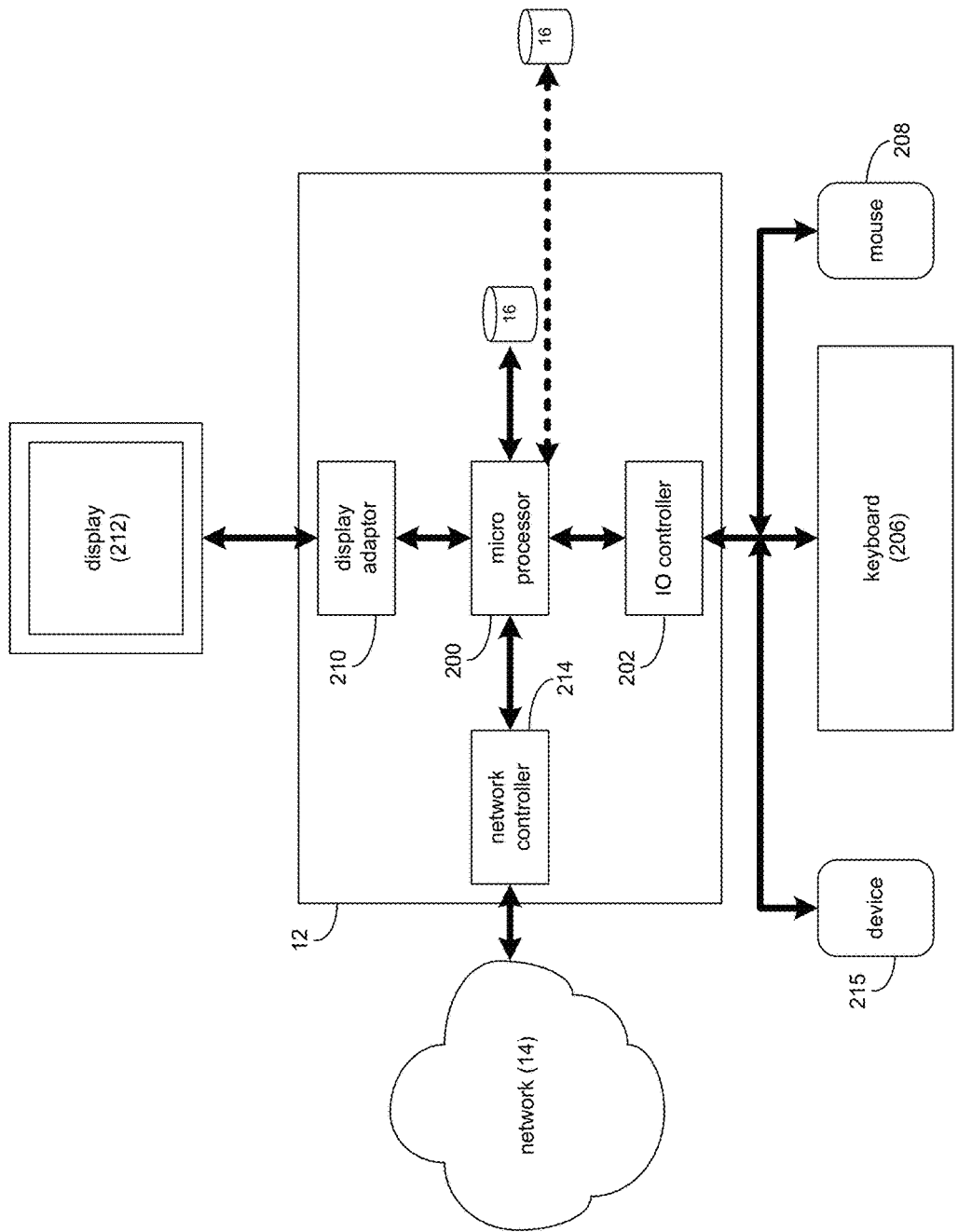
FIG. 2 is an example diagrammatic view of a client electronic device of FIG. 1 according to one or more example implementations of the disclosure.

Referring also to the example implementation of FIG. 2, there is shown a diagrammatic view of computer 12. While computer 12 is shown in this figure, this is for example purposes only and is not intended to be a limitation of this disclosure, as other configurations are possible. Additionally, any computing device capable of executing, in whole or in part, CS process 10 may be substituted for computer 12 (in whole or in part) within FIG. 2, examples of which may include but are not limited to client electronic devices 38, 40, 42, 44.

In some implementations, computer 12 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 16). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

Figure 4:
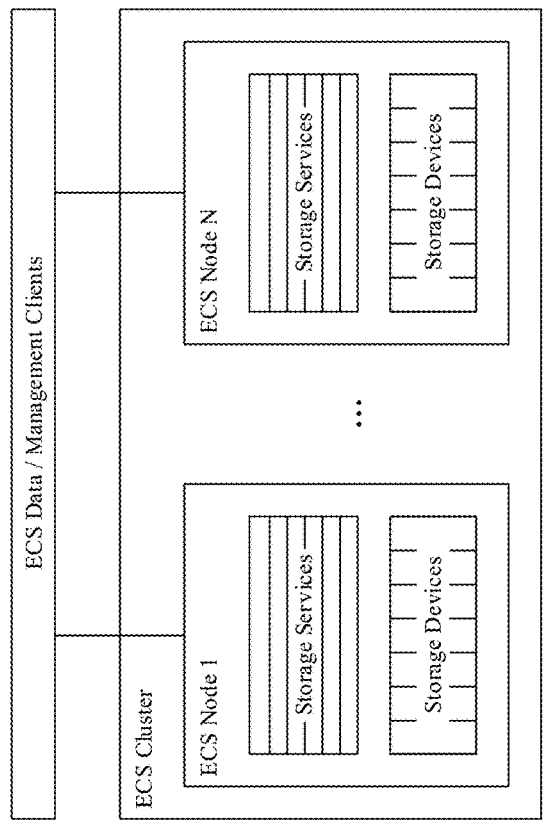
FIG. 4 is an example diagrammatic view of a high level architecture of a cluster according an example implementation of the disclosure.

Refer now to the implementation of FIG. 4, in which cluster 400 consists of one or more storage nodes (e.g., hardware nodes). In this implementation, each storage node may manage (e.g., via GC process 10 and/or cloud application 20) several storage devices. In some implementations, the storage devices of a cluster, such as cluster 400, may include, e.g., hard disk drives, aka HDDs. In other implementations, other types of storage devices may be used without departing from the scope of the disclosure.

In some implementations, the HDDs may be used to store user data (e.g., comment, description, tag, etc.) and system metadata. For example in certain implementaitons, user data may be content of a block/file/object received from a client application (such as client application 22 of FIG. 1). In certain implementations, search trees that may be used to keep the metadata may be large. In some implementations, tree updates may be very expensive on resources. Thus, in some implementations, journals may be used. In some implementations, the journal may be a tree journal or other type of journal. In some implementations, the tree journal may be a binary tree, red-black tree, B-tree, or other type of tree. In further implementations, the journal may be a linear journal. In other implementations, a journal may be divided into structure containing data and a structure mapping that data. In some implementations, there may be a journal per search tree. In an implementation, when a journal contains enough information, a bulk update may be applied to the corresponding tree. In some implementations, journals may contain tree modification requests of the following example types: (1) Create a key, e.g., an object ID, with a value, e.g., the metadata associated with the object; (2) Update value for a key after some event, e.g., the application sent new metadata, or cache process 10 (re)stored object content in some new chunk so object location information has changed; (3) Delete a key.

In certain implementations, a single node of a cluster that runs on a hardware appliance may manage, e.g., from 15 to 60 storage devices, although more or less storage devices may also be managed. In some implementations, each node may run (e.g., via GC process 10 and/or cloud application 20) a number of services, which may together implement a storage business logic. For instance, in some implementations, a single node may manage around 20 services, although more or less services may also be managed. In some implementations, other example clusters may be used without departing from the scope of the disclosure. However, as used herein the term cluster and ECS may be used interchangeably.

In certain implementations, cluster technology, such as ECS, may use innovative methods for HDD (or other storage device) capacity management. Referring still to the example implementation of FIG. 4, cluster 400 (e.g., via GC process 10 and/or cloud application 20) may rely on a file system. For example, in some implementations, the storage device space if cluster 400 may be partitioned into a set of blocks of fixed size called "chunks." Generally, information, user data, and various kinds of metadata may be stored in these chunks.

In some implementations, there may be different types of chunks (e.g., one type per capacity user). For instance, in some implementations, user data may be stored in one or more so-called "repository chunks," or just "repo chunks." As another example, in some implementations, data replicated from a remote location may be stored in one or more so-called "replication chunks." In many implementations, the cluster process for data regeneration may be referred to as "recovery," and may store the associated data in one or more so-called "recovery chunks." In some implementations, cluster 400 (e.g., via GC process 10 and/or cloud application 20) may include a plurality of system processes that may minimize capacity overheads on data protection. In certain implementations, Erasure Coding (EC) and XOR upon replicated data, which may store associated data in one or more so-called "EC chunks" and "XOR chunks," may minimize capacity overhead on data protection In many implementations, metadata may be stored in a tree-like structure, where the trees may be stored in one or more so-called "tree chunks." In certain implementations, tree journals may be stored in one or more so-called "journal chunks".

Figure 5:
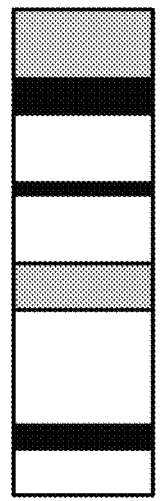
FIG. 5 is an example diagrammatic view of a data chunk according to an example implementation of the disclosure.

Referring now to the example implementation of FIG. 5, an example layout of a repo chunk (e.g., repo chunk 500) is shown. In some implementations, chunks of each type may be shared. For instance in some implementations, one repo chunk may contain fragments of several user objects. For example, as can be seen in the example implementation of FIG. 5, a single repo chunk may include mixed segments of one or more user objects (e.g., object 1, object 2, object 3, etc.). In some implementations, there may be a number of storage services that may work with their associated storage devices and chunks. For instance, in a particular implementation a GC process and/or cloud application includes a storage chunk management service that facilitates storage chunk allocation/reclamation, protection via EC, Geo replication, etc. In some implementations, a GC process and/or cloud application 20 may include a storage (server) management service that may manage available storage devices capacity and track storage device states. In some implementations, a GC process and/or cloud application 20 may include a storage (server) service that may interface with the storage devices.

Figure 6:
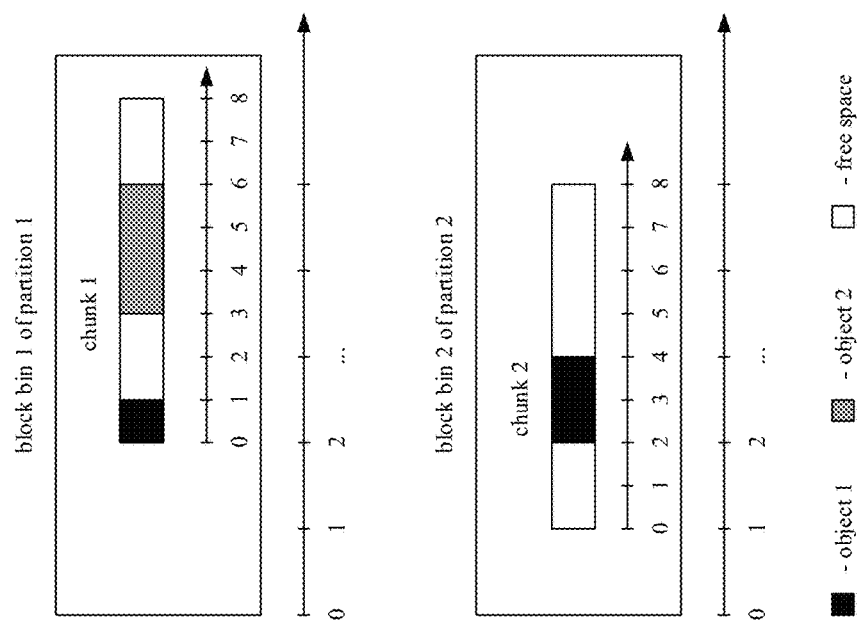
FIG. 6 is an example block bin and chunk layout before garbage collection occurs according to an example implementation of the disclosure.

In the example implementation of FIG. 6, an example block bin and chunk layout 600 before the above-noted garbage collection occurs is shown. In the example of FIG. 6, there are two chunks (e.g., chunk 1 and chunk 2) in storage device 16, that stores data segments of two objects (e.g., object 1 and object 2). In the example of FIG. 6, chunk 1 may be a part of block bin 1 of partition 1 and chunk 2 may be a part of block bin 2 of partition 2. In this implementation, assume for example purposes only that these two chunks have low capacity efficiency use. In this example, the goal of garbage collection (GC) process may be to increase capacity use efficiency via, e.g., copying object 1 and object 2 segments to a new chunk, and reclaiming capacity occupied by chunk 1 and chunk 2. In other embodiments, more or less chunks may be used without departing from the scope of the disclosure.

As noted above in certain implementations, a cluster may run a set of storage services, which together may implement, e.g., storage business logic. In some implementations, an example service may include, e.g., a so-called blob service. Generally, a Binary Large OBject (BLOB) may be a collection of binary data stored as, e.g., a single entity in a database management system. In some implementations, blobs may be, for example, images, audio or other multimedia objects, binary executable code, etc. In certain implementations a GC process may maintain an object table, such as the example object table in Table 1 below. In some implementations, an object table may keep track of some or all objects in the system. In the example, before GC process starts, the object table may contain the following example information.

TABLE 1

Object table before GC

| Object ID | Object Info | | |
|---|---|---|---|
| | Chunk ID | Offset | Length |
| 1 | 1 | 0 | 1 |
| | 2 | 2 | 2 |
| 2 | 1 | 3 | 3 |

As seen in the example, object 1 has, e.g., two segments: one in chunk 1 and one in chunk 2. Further in the example, object 2 consists of one segment in chunk 1. In other implementations, various other numbers of chunks per object and partition may be used without departing from the scope of the disclosure.

In some implementations, a GC process may include a chunk management (CM) service that may maintain a chunk table, such as the example chunk table in Table 2 below. In the example below, before a GC process starts, the table may contain the following example information.

TABLE 2

Chunk table before GC

| Chunk ID | Chunk Info | | | |
|---|---|---|---|---|
| | Partition | Block bin | Offset | Length |
| 1 | 1 | 1 | 2 | 8 |
| 2 | 2 | 2 | 1 | 8 |

As seen in the example Table 2, chunk 1 may be a part of block bin 1 of partition 1 and chunk 2 may be a part of block bin 2 of partition 2. In other implementations, various other numbers of chunks per block bin and partition may be used without departing from the scope of the disclosure.

In some implementations, a GC process may include storage service manager (SSM) that may keep track of free and used capacity blocks. In the example, before a GC process starts, the example SSM table may contain the following example information.

TABLE 3

Storage service manager table before GC

| Partition | Block bin | Offset | Length | User |
|---|---|---|---|---|
| Busy blocks | | | | |
| 1 | 1 | 2 | 8 | chunk 1 |
| 2 | 2 | 1 | 8 | chunk 2 |

Figure 7:
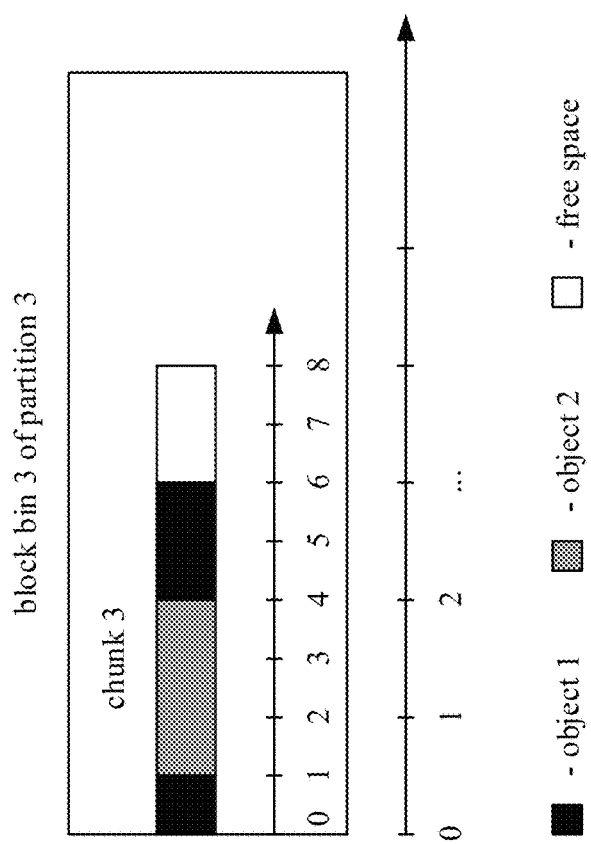
FIG. 7 is an example block bin and chunk layout before garbage collection occurs an example block bin and chunk layout 700 after garbage collection occurs according an example implementation of the disclosure.

As seen in the example Table 3, during garbage collection, chunk 3 may be allocated within block bin 3 of partition 3. In some implementations, user data segments from chunk 1 and chunk 2 may be copied by a GC process to this new chunk 3. In some implementations, the segments may be copied in the order they are stored in the old chunks, e.g., the two segments of object 1 are not merged. In certain implementations, after copying is complete, chunk 1 and chunk 2 may be verified and their capacity may be reclaimed by a GC process. The example implementation of FIG. 7 shows an example block bin and chunk layout 700 after GC, and the example tables below show the example resulting system state.

TABLE 4

Object table after GC

| Object ID | Object Info | | |
|---|---|---|---|
| | Chunk ID | Offset | Length |
| 1 | 3 | 0 | 1 |
| | 3 | 4 | 2 |
| 2 | 3 | 1 | 3 |

TABLE 5

Chunk table after GC

| Chunk ID | Chunk Info | | | |
|---|---|---|---|---|
| | Partition | Block bin | Offset | Length |
| 3 | 3 | 3 | 3 | 8 |

TABLE 6

Storage service manager table after GC

| Partition | Block bin | Offset | Length | User |
|---|---|---|---|---|
| Busy blocks | | | | |
| 3 | 3 | 0 | 8 | chunk 3 |
| Free blocks | | | | |
| 1 | 1 | 2 | 8 | — |
| 2 | 2 | 1 | 8 | — |

As seen in the example Table 6, capacity of chunks 1 and 2 became free, and the same objects may occupy a single chunk (e.g., chunk 3). Therefore, in the example of Table 6, capacity use efficiency for the given two objects increased by, e.g., two times.

In some implementations, a GC process (e.g., via a cloud application) may be executed as a fixed object content storage that may address an object using so-called content address. Thus, in some implementations, a GC process may be a Content Addressed Storage (CAS) or the like.

As noted above, in some implementations, a GC process (e.g., via a client application) may store a data object as a BLOB. In some implementations, the data object may be sent (e.g., via a client application) to an API of, e.g., a cloud application, which may calculate the object Content Address (CA) from the object binary representation. In some implementations, this CA, which may be unique for the object's content, and metadata about the object, may be inserted into, e.g., an XML, file, called a C-Clip Descriptor File (CDF), which in turn may have its content address calculated (e.g., via cloud application 20).

Figure 8:
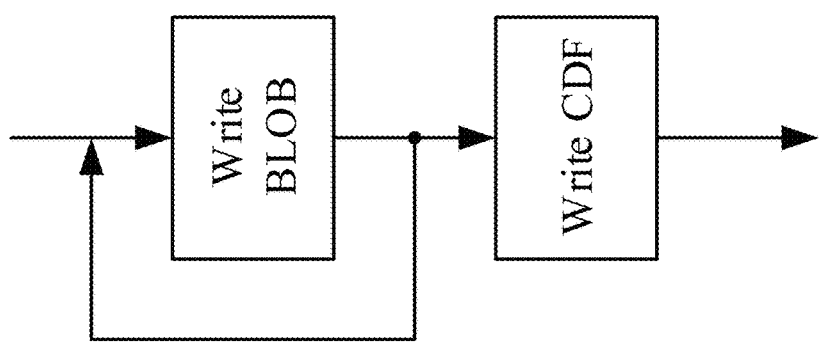
FIG. 8 is an example C-Clip write transaction according to an example implementation of the disclosure.

Referring to the example implementation of FIG. 8, which illustrates an example C-Clip write transaction 800. In the embodiment of FIG. 8, C-Clip CA may be returned to the application once the CDF and BLOB have been successfully stored and/or protected in the storage device (e.g., storage device 16). In some implementations, the C-Clip may be the union of the CDF and its content objects (e.g., one CDF may reference multiple BLOBS (e.g., up to 100,000 BLOBs), and one BLOB may be referenced by multiple (e.g., millions) of CDFs).

In some implementations, a BLOB(s) may be stored in storage device 16 before the CDF that references the BLOB(s). In certain implementations, future requests for the retrieval of the data object may occur when the client application submits the C-Clip's CA for that object to storage via the API. Thus, in some implementations, the CA may be a fingerprint that may assure the authenticity of the stored object. In some implementations, if an object (e.g., BLOB) is retrieved and altered by even one bit, when the modified object is subsequently stored, the API may produce a new CDF with a new content address for the altered BLOB. In other implementations, an original object may still be unchanged and accessible by its original content address.

In some implementations, the API (e.g., of cloud application 20) may support object deletion, where the delete operation may work at the CDF level. Generally, in some implementations, once CDF references to the BLOB have been deleted, the data objects (BLOBs) may be considered "orphans." In some implementations, the capacity occupied by the orphans may be reclaimed for available storage space by a background garbage collection (GC) process (e.g., via GC process 10).

Figure 9:
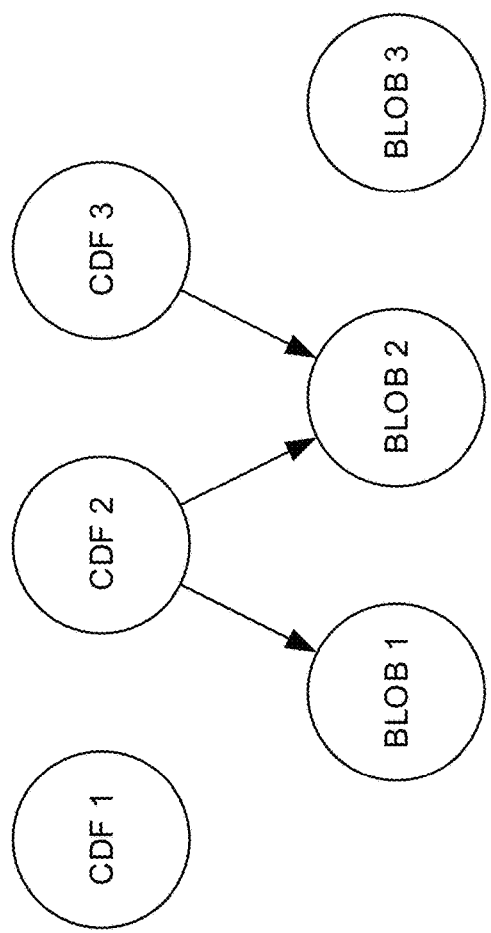
FIG. 9 illustrates example relations between CDFs and BLOBs according to an example implementation of the disclosure.

Referring to the example implementation of FIG. 9, example relations 900 between CDFs and BLOBs are shown. In the implementation of FIG. 9, CDF 1 does not reference any BLOBs; CDF 2 references 2 BLOBs (e.g., BLOB 1 and BLOB 2); and CDF 3 references one BLOB (e.g., BLOB 2). From the BLOBs' perspective, it may be seen in FIG. 9 that BLOB 1 is referenced by one CDF (e.g., CDF 2); BLOB 2 is referenced by two CDFs (e.g., CDF 2 and CDF 3); and BLOB 3 is not referenced by any CDFs. Thus, in the example, BLOB 3 may be considered an orphan and the capacity occupied by BLOB 3 may be reclaimed (e.g., via GC process 10). In other implementations, other example relations between CDFs and BLOBs may be used without departing from the scope of the disclosure.

In some implementations, detection of orphans may be accomplished with numerous techniques, but reliability of that detection may be an issue, since, e.g., BLOBs may gain and lose reference to them by CDFs asynchronously, and in a clustered environment, references to some BLOB may be handled independently on different cluster nodes.

For instance, in some implementations, a first example technique to detect orphans may be via a reference counting technique. For instance, in some implementations, a GC process may include a reference counter associated with each BLOB. In certain implementations, a counter may be incremented when some new CDF referencing the BLOB is created within cloud application. In other embodiments, a counter may be decremented when some CDF that references the BLOB is deleted. This technique may not be as reliable, since in some implementations, referenced BLOBS may be deleted by mistake, which may cause existing CDFs to reference the deleted BLOB.

As another example, in some implementations, a second example technique to detect orphans may be via a tracing technique. For instance, in some implementations, some or all CDFs known by a cloud application may result in a large root set. In an example implementation, a GC process may scan some or all of the file system to find some or all CDFs and BLOBs. In some implementations, each discovered CDF may be parsed in order to extract BLOB references from it, and a cloud application may use this information to create a map where the key may be the BLOB's CA and the value may be the list of CAs of CDFs that reference the BLOB. In some implementations, after the map is complete, the process may be iterated over the list of discovered BLOBs to determine if there is at least one CDF that references the BLOB in the map. In some implementations, if no CDF references the BLOB, the capacity occupied by the BLOB may be reclaimed.

In some implementations, the tracing technique may not be the best approach. For instance, in some implementations, there may not be a way to accurately measure the number of orphans that are waiting to be reclaimed by a GC process. As a result, in certain implementations a GC process may not be able to start when it is needed, and may be able to start periodically or run in non-stop mode in the background. As another example, in some implementations, CDFs may be parsed iteratively for each GC cycle. Meanwhile, XML parsing may be a relatively expensive operation.

In some implementations, unrecoverable corruption of any CDF may make the above-noted GC process unsafe, and as a result, the GC process typically does not run and does not reclaim capacity when CDF corruption is detected. In certain implementations, CDF corruption may be more probable when CDFs are stored during an extended duration (e.g., several years).

In some implementations, a cloud application may not use traditional databases to store metadata and system data, and may instead use a homemade key-value search tree implementation to store them. In certain embodiments, the aforementioned technique and interface around it may generally be referred to as a directory table (DT). In some implementations, the DTs may be large, and thus a major part of each DT may be stored on, e.g., hard drives (e.g., via storage device 16). In some implementations, with reliance on DTs, a loss of some DTs may result in loss of a significant part of the stored user data.

In some implementations, from the point of view of a cloud application, BLOBs and CDFs may be fully independent objects. In some implementations, there may be a thin CAS implementation layer that connects BLOBs and CDFs in order to, e.g., serve data writes and reads. Thus, in some implementations, the above-noted techniques may not be as efficient and reliable for detection and reclamation of orphan BLOBs. As will be discussed in greater detail below, in some implementations, GC process 10 may be executed such that it may have the efficiency of reference counting and reliability of tracing.

Figure 3:
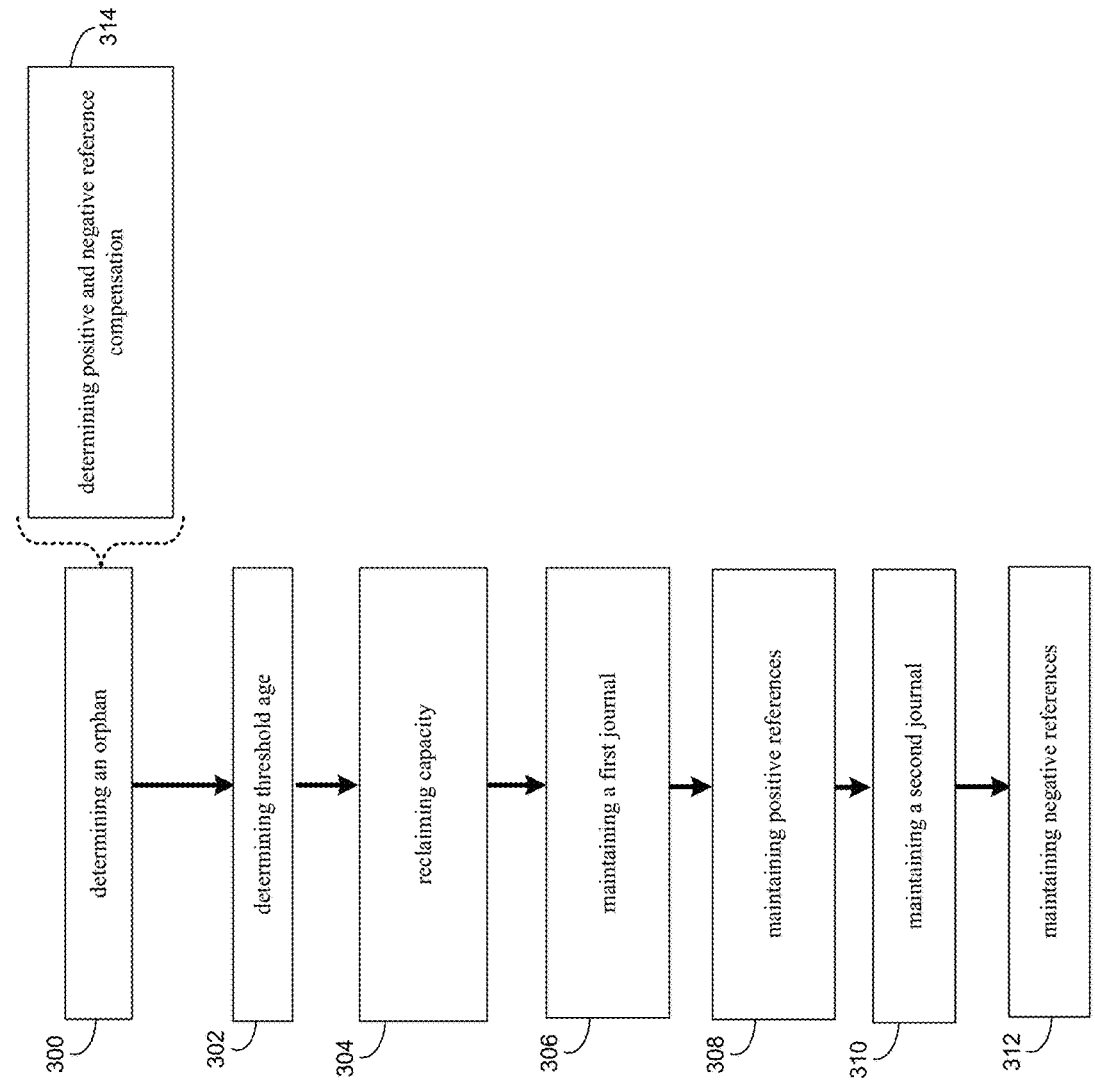
FIG. 3 is an example flowchart of a GC process according to an example implementation of the disclosure.

The GC Process:

Refer now to the example implementation of FIG. 3. A GC process determines (step 300), by a computing device, that an object of a plurality of objects is an orphan. GC process determines that the object is older than a threshold age (step 302). GC process reclaims a capacity occupied by the object based upon, at least in part, determining 300 that the object is an orphan and determining 302 that the object is older than the threshold age (step 304).

In some implementations, GC process may determine, by a computing device, that an object of a plurality of objects is an orphan. In some implementations, the object may be a Binary Large Object (BLOB), as is discussed above. In some implementations, the above-noted API (e.g., of a cloud application) may support object deletion, where the delete operation may work at the CDF level. In some implementations, once CDF references to the BLOB have been deleted, the data objects (BLOBs) may be considered "orphans". For example in the example implementation of FIG. 9, example relations 900 between CDFs and BLOBs are shown. In the example implementation of FIG. 9, CDF 1 does not reference any BLOBs; CDF 2 references 2

BLOBs (e.g., BLOB 1 and BLOB 2); and CDF 3 references one BLOB (e.g., BLOB 2). From the BLOBs' perspective, it may be seen in FIG. 9 that BLOB 1 is referenced by one CDF (e.g., CDF 2); BLOB 2 is referenced by two CDFs (e.g., CDF 2 and CDF 3); and BLOB 3 is not referenced by any CDFs. Thus, in the example implementation of FIG. 9, GC process 10 may determine 300 that BLOB 3 is an orphan.

In some implementations, a GC process (e.g., via a cloud application) may use a so-called directory table (DT) to track BLOB references. In some implementations, for a DT, a key may be a BLOB content address (CA), and a value may be the set of CAs of the CDFs that reference the BLOB, which may be referred to as a DT Object References (OR). In some implementations, the DT may be a general concept like the above-noted data store. DT may have an abstract interface that describes functionality of DTs (e.g., as a set of search trees). In some implementations, each set may consist of 128 trees. In some implementations, there may be a hash function that determines "home tree" for each given key value. In some implementations, the above-noted object table, chunk table, and other tables may generally be considered DTs. In some implementations, a GC process may traverse a DT OR (which in some implementations may be a search tree) to identify some or all BLOBs known to a cloud application to then determine 3 whether or not they are orphans. In some implementations, if a GC process determines that a BLOB is not an orphan, a GC process may skip further processing of that BLOB (e.g., for purposes of reclaiming its occupied capacity).

In some implementations, using a DT OR may be impractical for automatic memory management where overheads on reference tracking may be unacceptably high. In some implementations, for instance, using non-automatic memory management, use of a DT OR may be reasonable, since, e.g., the total number of references to be tracked may be calculated using the following example and non-limiting formula:

$$N_{references} = M^*(N_{CDFs} + N_{BLOBs})$$

where M is some coefficient. In some implementations, M may be within the interval [0, 1]; however, M may also be outside the interval [0, 1].

In some implementations, an example difference between reference tracking compared to reference counting may be that reference tracking may handle references of full value, whereas with reference counting, each reference may be essentially a depersonalized "1".

In some implementations, a GC process may maintain a first journal, wherein the first journal may include a content address that references the object when the object is created. For example, in some implementations, a GC process may generate and maintain (e.g., via cloud application 20) a "Created CDFs Journal" (CCJ) as the first journal. In some implementations, a CCJ may contain CAs of CDFs that are created within a cloud application. In certain implementations, a CA of a CDF may be stored in the CCJ just before the CDF is persistently stored (e.g., in non-volatile memory of storage device 16). In some implementations, a CCJ may be processed in the background. In some implementations, BLOB references may be extracted by a GC process from CDFs created and stored in a DT OR, e.g., as an update. In some implementations, e.g., if incoming traffic is "moderate", GC process 10 (e.g., via a CCJ processor) may attempt to handle CDFs while they are still in RAM.

In some implementations, a GC process may determine that an object is older than a threshold age. For example, in some implementations, when a GC process (e.g., via a CCJ processor) picks up another CA, the GC process may be aware that there is no CDF in the DT OR with such a CA. In some embodiments, it may be a valid case, since, e.g., the CDF CA may go to the CCJ before the new CDF is completely handled by cloud application 20. In some other implementations, it also may be possible that a CDF write transaction was canceled. In the example, the CDF reference may then be considered "hanging". In some implementations, to remedy the possibility of encountering a hanging CDF reference, a GC process may operate under an assumption/limitation that a C-Clip write transaction may not take longer than a predetermined threshold period of time (e.g., two weeks). In certain implementations, if a GC process determines that if after an example two week threshold time there is no CDF referenced, the GC process may remove the CDF CA from the CCJ. In some other implementations, if a GC process determines that a CDF referenced is less than two weeks old, the GC process may temporarily (e.g., until the CDF referenced is at least two weeks old) skip further processing of that BLOB referenced by the CDF (e.g., for purposes of reclaiming its occupied capacity).

In some implementations, a GC process may maintain a second journal, wherein the second journal may include a content address of a file that references the object when the object is deleted. For example, in some implementations, a GC process may generate and maintain (e.g., via cloud application 20) a "Deleted CDFs Journal" (DCJ) as the second journal. In some implementations, a DCJ may contain CAs of CDFs that are deleted from within a cloud application. In some implementations, a CA of a CDF may be stored in a DCJ before the CDF is marked as deleted. In some implementations, a CDF may be physically deleted from its storage location before it is handled by GC process 10 (e.g., via a DCJ processor). In some implementations, CDFs that are marked as deleted may not be visible to a GC process. In some implementations, a DCJ may be processed by a GC process in the background. In some implementations, BLOB references may be extracted by a GC process from the deleted CDFs and GC process 10 may update a DT OR.

In some implementations, e.g., when a GC process (e.g., via the DCJ processor) picks up another CA, a GC process may be aware that there is no deleted CDF in a DT OR with such a CA. In the example, the deleted CDF reference may then be considered "hanging". In some implementations, to remedy a possibility of encountering a hanging CDF reference, a GC process may proceed similarly to how hanging CDF references in a CCJ are handled. As such, in the example, if a GC process determines that if after the example two week threshold time there is still no CDF referenced, a GC process may remove the CDF CA from the DCJ. On the contrary, in some implementations, if a GC process determines that a CDF referenced is less than two weeks old, a GC process may temporarily (e.g., until the CDF referenced is at least two weeks old) skip further processing of that BLOB referenced by the CDF (e.g., for purposes of reclaiming its occupied capacity).

In some implementations, a GC process may maintain a set of one or more positive references to the object populated from the first journal, and a GC process may maintain a set of one or more negative references to the object populated from the second journal. For example, in some implementations, e.g., in clustered environment, it may be possible to have a situation when a GC process (e.g., via the DCJ processor) handles a CDF before the CDF was processed by a GC process (e.g., via the CCJ processor). In certain implementations, in a situation where a GC process handles a CDF before the CDF was processed, such as when an application (e.g., cloud application 20) deletes a C-Clip just after the C-Clip was written (e.g., to storage device 12). In some implementations, to help remedy this situation, a GC process may maintain positive BLOB references populated from a CCJ and may maintain negative BLOB references populated from the DCJ. In some implementations, a GC process may store the example positive and negative BLOB references in the above-noted DT OR.

In some implementations, determining that the object is an orphan may include a GC process determining that the set of one or more positive references to the object populated from the first journal compensates the set of one or more negative references to the object populated from the second journal. For example, in some implementations, with the above approach, there may not be a need to synchronize the above-noted CCJ and DCJ processor(s). For instance, in some implementations, positive and negative references may be determined to have been compensated by each other.

For instance, in some implementations, some cluster nodes may handle BLOB references for the CDF and crash several times before the CDF is removed from the journal. In another example, the CDF delete may be fully handled before its creation is fully handled. To support this, GC process 10 may maintain two sets of references for each BLOB. In some implementations, new CDFs may produce positive blob references and deleted CDFs may produce negative references. In some implementations, a positive and negative reference may compensate each other when there are both positive and negative references from one CDF. In some implementations, it may be safe to ignore such references. In some implementations, when all references compensate each other for a BLOB, GC process 10 may determine it to be an orphan. In some implementations, references are not deleted to support a case when one CDF creation/deletion is handled multiple times. In some implementations, a CDF may not be physically deleted from its storage location before positive and negative references are extracted from the CDF. That is, in some implementations, a CDF may not be physically deleted from its storage location before the CDF is handled by the above-noted CCJ processor and DCJ processor. In some implementations, the CCJ processor and the DCJ processor may be the same processor.

In some implementations, when a BLOB is determined to be an orphan (e.g., the BLOB has no references to it as noted above) or the BLOBs' positive references are determined to have been compensated by the BLOBs' negative references, a GC process may consider the BLOB as potential garbage to be reclaimed. However, in some implementations, a GC process may still consider the BLOB as not being garbage to be reclaimed. For example, as noted above, the CDF that references the BLOB may not yet have been written, and the CDF may have already been stored but it has not yet been handled by the above-noted CCJ processor.

On the other hand, as noted above, in some implementations, it may also be possible that the CDF that references the BLOB will not be written, since the C-Clip write transaction may have been canceled. As such, in some implementations, it may not be safe or sufficient to delete the BLOB and reclaim its capacity at the moment when a GC process determines that the positive and the negative references to the BLOB compensate each other.

In some implementations, a GC process may be executed upon the occurrence of a "triggering" event. For instance, in some implementations, a triggering event may include determining that a total number of potential orphans exceeds a threshold of potential orphans. For instance, assume for example purposes only that the threshold of potential orphans is, e.g., 100. In the example, a GC process determines that there is at least 100 potential orphans, the GC process may be executed. On the contrary, if a GC process does not determine 300 that there are at least 100 potential orphans, a GC process may wait for its execution to begin.

As another example, in some implementations, a triggering event may include determining that a total capacity occupied by potential orphans exceeds a threshold. For instance, assume for example purposes only that the threshold of total capacity occupied by potential orphans is, e.g., 100 GB. In the example, if a GC process determines that there is at least 100 GB of space occupied by potential orphans, the GC process may be executed. In other implementaitons, if a GC process does not determine that there is at least 100 GB of space occupied by potential orphans, a GC process may wait for its execution to begin.

As another example, in some implementations, a triggering event may include determining that the last time since a GC process was executed exceeds a threshold. For instance, in a particular implementation assume for example purposes only that the threshold time since a GC process was executed is, e.g., two weeks. In the particular example, if the GC process determines that the last time the GC process was executed is two weeks ago or more, the GC process may be executed. In this particular implementation, if a GC process does not determine that the last time the GC process was executed is two weeks ago or more, the GC process may wait for its execution to begin.

In some implementations, a maximal time interval threshold between two subsequent GC process runs may be beneficial for, e.g., systems where C-Clip deletion is a rare event. In some implementations, an example and non-limiting goal of a GC process for this type of system may be cleanup after a cancelled C-Clip write transaction.

In some implementations, upon being triggered, a GC process may fix the current time and may use this value as a baseline. For instance, in some implementations, a GC process may force processing of current CCJ content based upon when a triggering event occurred. In some implementations, a GC process may force CCJ processing to make sure it does not miss any positive BLOB reference that may be hanging. In some implementations, a GC process may not force DCJ processing, which may allow CCJ and DCJ processing not to be synchronized.

In some implementations, a GC process may reclaim a capacity occupied by an object based upon, at least in part, determining that the object is an orphan and determining that the object is older than the threshold age. For instance, in some implementations, upon the determination that a BLOB is an orphan, and upon determining that the BLOB is older than the example two week threshold age, the BLOB may be considered as a "true" orphan, which may be safe to reclaim. In some implementations, a GC process may reclaim capacity occupied by a BLOB. In some implementations, reclamation may generally be described as the act of returning busy capacity blocks (or other data structure) to the free state. In some implementations, the direct result of reclamation may be the appearance of the free capacity blocks in the above-noted SSM table.

In some implementations, the order of BLOB checks may vary. For instance, in some implementations, the BLOB age check may precede the BLOB status check determination (e.g., orphan/non-orphan). As such, the example implementation of first determining whether a BLOB is an orphan and second determining an age of the BLOB should be taken as an example only.

Thus, in some implementations, a GC process may detect potential orphans at the moment a DT OR is updated. In the example, this may allow having a measure of the amount of work there is for a GC process to perform, which may result in a GC process having good progress in terms of capacity reclaimed. In some implementations, the above-noted CDFs may need to be parsed twice by a GC process (e.g., once by the above-noted CCJ processor and once by the above-noted DCJ processor). In certain implementations, there may not be a need to parse CDFs for each round of garbage collection. In some implementations, unrecoverable corruption of a CDF may not block a GC process. For example, in some implementations, after BLOB references are extracted from a CDF, a GC process may not require the CDF content to progress.

Thus, in some implementations, a GC process may be considered as a reference tracking garbage collection technique (e.g., for clustered implementation or otherwise) of Content Addressed Storage (CAS), where the efficiency of the process may be close (or equal) to the efficiency of reference counting techniques, while its reliability may be close (or equal) to the reliability of tracing techniques.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   maintaining, via a computing device, a first journal, wherein the first journal includes a content address that references an object when the object is created;
   maintaining a second journal, wherein the second journal includes a content address of a file that references the object when the object is deleted;
   updating a directory table associated with the second journal including the content address of the file that references the object when the object is deleted;
   determining that the object of a plurality of objects is an orphan based upon, at least in part, the first and second journals, at the time the directory table is updated;
   determining that the object is older than a threshold age, wherein upon determining that the object is older than the threshold age, removing a file having the content address that references the object from the first journal; and
   reclaiming a capacity occupied by the object based upon, at least in part, determining that the object is an orphan and determining that the object is older than the threshold age.

2. The computer-implemented method of claim 1 wherein the object is a Binary Large Object (BLOB).

3. The computer-implemented method of claim 1 further comprising maintaining a set of one or more positive references to the object populated from the first journal.

4. The computer-implemented method of claim 3 further comprising maintaining a set of one or more negative references to the object populated from the second journal.

5. The computer-implemented method of claim 4 wherein determining that the object is an orphan includes determining that the set of one or more positive references to the object populated from the first journal compensates the set of one or more negative references to the object populated from the second journal.

6. A computer program product residing on a non-transitory computer readable storage medium having a plurality of instructions stored thereon which, when executed across one or more processors, cause at least a portion of the one or more processor to perform operations comprising:
   maintaining a first journal, wherein the first journal includes a content address that references an object when the object is created;
   maintaining a second journal, wherein the second journal includes a content address of a file that references the object when the object is deleted;
   updating a directory table associated with the second journal including the content address of the file that references the object when the object is deleted;
   determining that the object of a plurality of objects is an orphan based upon, at least in part, the first and second journals, at the time the directory table is updated;
   determining that the object is older than a threshold age, wherein upon determining that the object is older than the threshold age, removing a file having the content address that references the object from the first journal; and
   reclaiming a capacity occupied by the object based upon, at least in part, determining that the object is an orphan and determining that the object is older than the threshold age.

7. The computer program product of claim 6 wherein the object is a Binary Large Object (BLOB).

8. The computer program product of claim 6 further comprising maintaining a set of one or more positive references to the object populated from the first journal.

9. The computer program product of claim 8 further comprising maintaining a set of one or more negative references to the object populated from the second journal.

10. The computer program product of claim 9 wherein determining that the object is an orphan includes determining that the set of one or more positive references to the object populated from the first journal compensates the set of one or more negative references to the object populated from the second journal.

11. A computing system including one or more processors and one or more memories configured to perform operations comprising:
   maintaining a first journal, wherein the first journal includes a content address that references an object when the object is created;
   maintaining a second journal, wherein the second journal includes a content address of a file that references the object when the object is deleted;
   updating a directory table associated with the second journal including the content address of the file that references the object when the object is deleted;
   determining that the object of a plurality of objects is an orphan based upon, at least in part, the first and second journals, at the time the directory table is updated;
   determining that the object is older than a threshold age, wherein upon determining that the object is older than the threshold age, removing a file having the content address that references the object from the first journal; and
   reclaiming a capacity occupied by the object based upon, at least in part, determining that the object is an orphan and determining that the object is older than the threshold age.

12. The computing system of claim 11 further comprising maintaining a set of one or more positive references to the object populated from the first journal.

13. The computing system of claim 12 further comprising maintaining a set of one or more negative references to the object populated from the second journal.

14. The computing system of claim 13 wherein determining that the object is an orphan includes determining that the set of one or more positive references to the object populated from the first journal compensates the set of one or more negative references to the object populated from the second journal.

* * * * *